(12) United States Patent
Zhi et al.

(10) Patent No.: US 12,232,150 B2
(45) Date of Patent: Feb. 18, 2025

(54) DATA TRANSMISSION METHOD AND DATA TRANSMISSION DEVICE

(71) Applicant: SAMSUNG ELECTRONICS CO., LTD., Suwon-si (KR)

(72) Inventors: Yajun Zhi, Xi'an (CN); Fanrong Hao, Xi'an (CN); Ying Huang, Xi'an (CN); Fei Wang, Xi'an (CN); Kun Wang, Xi'an (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 563 days.

(21) Appl. No.: 17/511,197

(22) Filed: Oct. 26, 2021

(65) Prior Publication Data

US 2022/0248407 A1    Aug. 4, 2022

(30) Foreign Application Priority Data

Feb. 3, 2021  (CN) .......................... 202110149031.3

(51) Int. Cl.
*H04L 12/54* (2022.01)
*H04L 27/26* (2006.01)
(Continued)

(52) U.S. Cl.
CPC ......... *H04W 72/53* (2023.01); *H04L 27/2601* (2013.01); *H04W 84/12* (2013.01)

(58) Field of Classification Search
CPC . H04L 27/2601; H04L 5/0037; H04L 5/0044; H04L 5/006; H04W 72/53; H04W 84/12
See application file for complete search history.

(56) References Cited

U.S. PATENT DOCUMENTS 9,991,996 B2   6/2018  Chu et al.
10,142,962 B2  11/2018 Lee et al.
(Continued)

FOREIGN PATENT DOCUMENTS

| CN | 105846978 A | 8/2016 |
|----|-------------|--------|
| CN | 106131962 A | 11/2016 |
| WO | 2019/066587 A1 | 4/2019 |

OTHER PUBLICATIONS

"Draft Standard for Information technology—Tele-communications and information exchange between systems Local and metropolitan area networks-Specific requirements Part 11: Wireless LAN Medium Access Control (MAC) and Physical Layer (PHY) Specifications", IEEE Computer Society, IEEE P802.11axTM/D6.0, Nov. 2019, pp. 1-780 (780 pages total).

(Continued)

*Primary Examiner* — Phuc H Tran
(74) *Attorney, Agent, or Firm* — Sughrue Mion, PLLC (57) ABSTRACT

The disclosure provides a data transmission method and a data transmission device. The data transmission method includes allocating corresponding Orthogonal Frequency Division Multiple Access (OFDMA) sub-channels to respective target neighbor devices in a wireless personal area network (WPAN) based on a determination that a current data transmission scenario of the WPAN is a specific data transmission scenario and transmitting data in the preset data transmission scenario to the respective target neighbor devices through the OFDMA sub-channels. Moreover, according to the data transmission method, an OFDMA transmission mechanism is supported in a SoC system under a wireless local area network and the wireless personal area network, and the OFDMA transmission mechanism is provided in data transmission scenarios with a large amount of (Continued)

data, thereby improving the data transmission rate and saving the data transmission time.

20 Claims, 2 Drawing Sheets

(51) Int. Cl.
*H04W 72/53* (2023.01)
*H04W 84/12* (2009.01)

(56) References Cited

U.S. PATENT DOCUMENTS

| | | |
|---|---|---|
| 10,462,802 B2 | 10/2019 | Marinier et al. |
| 10,708,915 B2 | 7/2020 | Kim et al. |
| 2008/0304584 A1* | 12/2008 | Nishio .............. H04L 25/03159 375/260 |
| 2009/0092073 A1* | 4/2009 | Doppler ................ H04B 7/026 370/336 |
| 2016/0242200 A1* | 8/2016 | Yan .................... H04W 72/1263 |
| 2017/0019895 A1 | 1/2017 | Kakani et al. |
| 2018/0184449 A1 | 6/2018 | Wilhelmsson et al. |
| 2020/0195386 A1 | 6/2020 | Marinier et al. |
| 2020/0205062 A1 | 6/2020 | Azizi et al. |
| 2020/0205230 A1 | 6/2020 | Haustein et al. |

OTHER PUBLICATIONS

"IEEE Standard for Low-Rate Wireless Networks", IEEE Computer Society, Dec. 5, 2015, pp. 1-708 (708 pages total).

* cited by examiner

DATA TRANSMISSION METHOD AND DATA TRANSMISSION DEVICE

CROSS-REFERENCE TO RELATED APPLICATION

This application is based on and claims priority under 35 U.S.C. § 119 to Chinese Patent Application No. 202110149031.3 filed on Feb. 3, 2021, in the Chinese Patent Office, and the disclosure of which is incorporated by reference herein in its entirety.

BACKGROUND

1. Field

The disclosure relates to a technical field of data transmission, and in particular, to a data transmission method and a data transmission device.

2. Description of Related Art

In the field of communication networks, a wireless local area network and a wireless personal area network may be provided. Recently, in order to solve a fragmentation problem of Internet of Things (IoT) and meet complex needs of the IoT, chips that support more coexistence of multiple network protocols are being applied to IoT scenarios such as smart homes with smart appliances. For example, some existing chips may support Bluetooth Low Energy 5, dual-band Wi-Fi and IEEE 802.15.4 technologies (including ZigBee and Open Thread).

In the wireless personal area network, device firmware upgrade and big block data transmission usually use point-to-point transmission, which takes a long time to complete the transmission. This transmission method has a low rate and has a significant impact on application services and user experience. In addition, IoT products may add more recognition and processing on voices, videos and sensor data, use deep learning functions to achieve deep intelligence for the IoT, and add preventive maintenance functions. As such, block data, which includes algorithm library modules and other data for performing these processing and functions need to be updated. The transmission rate of the point-to-point transmission method is relatively low, which is no longer sufficient for such scenarios.

SUMMARY

The exemplary embodiments of the present disclosure may at least solve the above problems, or may not solve the above problems.

According to an aspect of the disclosure, there is provided a data transmission method of a transmission device, the method comprising: allocating corresponding Orthogonal Frequency Division Multiple Access (OFDMA) sub-channels to respective target neighbor devices in a wireless personal area network (WPAN) based on a determination that a current data transmission scenario of the WPAN is a specific data transmission scenario; and transmitting data in the preset data transmission scenario to the respective target neighbor devices through the OFDMA sub-channels.

The specific data transmission scenario may be one of a large block data transmission scenario or a device firmware upgrade scenario.

The data transmission method may further comprise: determining one or more neighbor devices that support an OFDMA transmission mechanism among a plurality of neighbor devices in the wireless personal area network; and identifying the one or more neighbor devices that support the OFDMA transmission mechanism and are currently on the WPAN as the target neighbor devices.

The allocating the corresponding OFDMA sub-channels to the respective target neighbor devices in the WPAN may comprise: determining an allocation method according to a comparison result of a number of the target neighbor devices and a number of the sub-channels; and allocating the corresponding OFDMA sub-channels to the respective target neighbor devices based on the determined allocation method.

The determining the allocation method according to the comparison result of the number of the target neighbor devices and the number of the sub-channels and allocating the corresponding OFDMA sub-channels to the respective target neighbor devices based on the determined allocation method may comprise: based on the number of the target neighbor devices not being greater than the number of the sub-channels, allocating one corresponding OFDMA sub-channel to each of the target neighbor devices; and based on the number of the target neighbor devices being greater than the number of the sub-channels, grouping the target neighbor devices, and allocating one corresponding OFDMA sub-channel to each group of the target neighbor devices, wherein, a number of groups of the target neighbor devices is not greater than the number of the sub-channels, and each group of the target neighbor devices comprises at least one target neighbor device.

The grouping the target neighbor devices may comprise: grouping the target neighbor devices based on a Received Signal Strength Indication (RSSI) value or a communication service weight of each of the target neighbor devices.

The data transmission method may further comprise: transmitting inquiries for transmission mechanism switching results to the target neighbor devices, and receiving the transmission mechanism switching results returned by the target neighbor devices.

According to another aspect of the disclosure, there is provided a server comprising at least one computing device and at least one memory storing instructions, wherein the instructions, when executed by the at least one computing device, cause the at least one computing device to execute the data transmission method.

According to another aspect of the disclosure, there is provided a computer-readable storage medium storing instructions, wherein the instructions, when executed by at least one computing device, cause the at least one computing device to perform a data transmission method.

According to another aspect of the disclosure, there is provided a data transmission device, the device comprises: a processor configured to: allocate corresponding Orthogonal Frequency Division Multiple Access (OFDMA) sub-channels to respective target neighbor devices in a wireless personal area network (WPAN) based on a determination that a current data transmission scenario of the WPAN is a specific data transmission scenario; and transmit data in the preset data transmission scenario to the respective target neighbor devices through the OFDMA sub-channels.

The specific data transmission scenario may be one of a large block data transmission scenario or a device firmware upgrade scenario.

The processor may be further configured to: determine one or more neighbor devices that supports an OFDMA transmission mechanism among a plurality of neighbor devices in the wireless personal area network; and identify the one or more neighbor devices that supports the OFDMA transmission mechanism and are currently on the network as the target neighbor devices.

The processor may be further configured to: determine an allocation method according to a comparison result of a number of the target neighbor devices and a number of the sub-channels and allocate the corresponding OFDMA sub-channels to the respective target neighbor devices based on the determined allocation method.

The processor may be further configured to: based on the number of the target neighbor devices not being greater than the number of the sub-channels, allocate one corresponding OFDMA sub-channel to each of the target neighbor devices; and based on the number of the target neighbor devices being greater than the number of the sub-channels, group the target neighbor devices, and allocate one corresponding OFDMA sub-channel to each group of the target neighbor devices, wherein, a number of groups of the target neighbor devices is not greater than the number of the sub-channels, and each group of the target neighbor devices comprises at least one target neighbor device.

The processor may be further configured to group the target neighbor devices based on a Received Signal Strength Indication (RSSI) value or a communication service weight of each of the target neighbor devices.

The processor may be further configured to transmit inquiries for transmission mechanism switching results to the target neighbor devices, and receive the transmission mechanism switching results returned by the target neighbor devices.

According to another aspect of the disclosure, there is provided a data transmission device, the device comprises: a memory storing one or more instructions; and a processor configured to execute the one or more instructions to: identify a type of data transmission currently implemented by a wireless personal area network (WPAN); determine whether the type of data transmission currently implemented by the WPAN matches a specific criteria; allocate corresponding Orthogonal Frequency Division Multiple Access (OFDMA) sub-channels to respective target neighbor devices in the WPAN based on the type of data transmission currently implemented by the WPAN matching the specific criteria; and transmit data in the preset data transmission scenario to the respective target neighbor devices through the OFDMA sub-channels.

The specific criteria may be a large block data transmission scenario or a device firmware upgrade scenario.

The processor may be further configured to: determine an allocation method according to a comparison result of a number of the target neighbor devices and a number of the sub-channels and allocate the corresponding OFDMA sub-channels to the respective target neighbor devices based on the determined allocation method.

The processor may be further configured to: based on the number of the target neighbor devices not being greater than the number of the sub-channels, allocate one corresponding OFDMA sub-channel to each of the target neighbor devices; and based on the number of the target neighbor devices being greater than the number of the sub-channels, group the target neighbor devices, and allocate one corresponding OFDMA sub-channel to each group of the target neighbor devices, wherein, a number of groups of the target neighbor devices is not greater than the number of the sub-channels, and each group of the target neighbor devices comprises at least one target neighbor device.

BRIEF DESCRIPTION OF THE DRAWINGS

The above and/or other aspects will become more apparent by reference to embodiments which are illustrated in the appended drawings. Understanding that these drawings depict only certain embodiments and are not therefore to be considered to be limiting of the scope of the disclosure, the principles herein are described and explained with additional specificity and detail via the use of the accompanying drawings, in which.

DETAILED DESCRIPTION

The following description with reference to the accompanying drawings is provided to help a comprehensive understanding of the exemplary embodiments of the disclosure. Various specific details are included to help understanding, but these details are only to be regarded as exemplary. Therefore, those of ordinary skill in the art will recognize that various changes and modifications may be made to the exemplary embodiments described herein without departing from the scope and spirit of the disclosure. In addition, for clarity and conciseness, the descriptions of well-known functions and structures are omitted.

A wireless personal area network (WPAN) refers to an emerging wireless communication network technology proposed to achieve a small activity radius, rich service types, orientation toward specific groups, and wireless seamless connection. In terms of network composition, the WPAN is located at the end of an entire network chain and is used to realize connection between terminal and terminal at a same location, such as connection between a mobile phone and a Bluetooth headset. A range covered by the WPAN is generally within a radius of 10m and the WPAN must operate in a licensed wireless frequency band.

In order to address the technical problem of the transmission rate of the point-to-point transmission method being low, the inventors of the disclosure have studied the situation and have determined that based on topological characteristics of the wireless personal area network, it is possible to consider replacing the "point-to-point" data transmission mode in the related art with a "one-to-many" data transmission mode, so that an central node of a topology of the wireless personal area network may transmit data to multiple neighbor nodes at the same time, thereby improving the efficiency of overall data transmission.

To achieve the above "one-to-many" data transmission mode, an Orthogonal Frequency Division Multiple Access (OFDMA) transmission mechanism may be used. Specifically, the OFDMA transmission mechanism allows resource units (RU) to divide bandwidth according to needs of a terminal. An OFDMA system divides transmission bandwidth into a series of orthogonal non-overlapping sub-carrier sets, and allocates different sub-carrier sets to different users to achieve multiple access. Since different users occupy non-overlapping subcarrier sets, the system has no multi-user interference under ideal synchronization conditions. In the OFDMA transmission mechanism, a group of users may access a same channel at the same time. The OFDMA transmission mechanism may be regard as dividing total resources (time, bandwidth) in frequency to achieve multi-user access.

In view of the above, the disclosure proposes a multi-mode-oriented System on Chip (SoC) system, which uses the aforementioned OFDMA transmission mechanism to solve the efficiency problem of big block data transmission in a wireless low-rate network.

To facilitate the understanding of the solution of the disclosure, an exemplary application scenario of the disclosure may be that a plurality of environmental monitoring devices (for example, air pollutant monitoring devices, air humidity monitoring devices, etc.) are distributed in an industrial park. The working features of these environmental monitoring devices are to use a low-power mode to perform monitoring work, and then use a low-rate transmission protocol to periodically (for example, 24 hours) upload monitoring data to a server (for example, a monitoring cloud platform). Here, the plurality of environmental monitoring devices form a network topology similar to that shown in FIG. 1 or FIG. 2 of the disclosure according to an exemplary embodiment. When the plurality of environmental monitoring devices need to upgrade systems or update plug-ins, transmission of updated data may be performed using the data transmission method of the disclosure to improve the efficiency of data transmission.

The disclosure is not limited to the foregoing exemplary scenario, and may also include any other applicable scenarios to adaptively solve corresponding problems.

Figure 1:
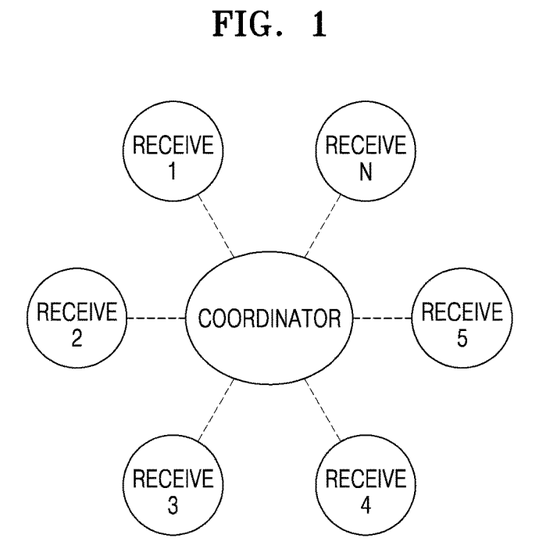
FIG. 1 is a schematic diagram of a star network topology provided by an exemplary embodiment of the disclosure.
Figure 2:
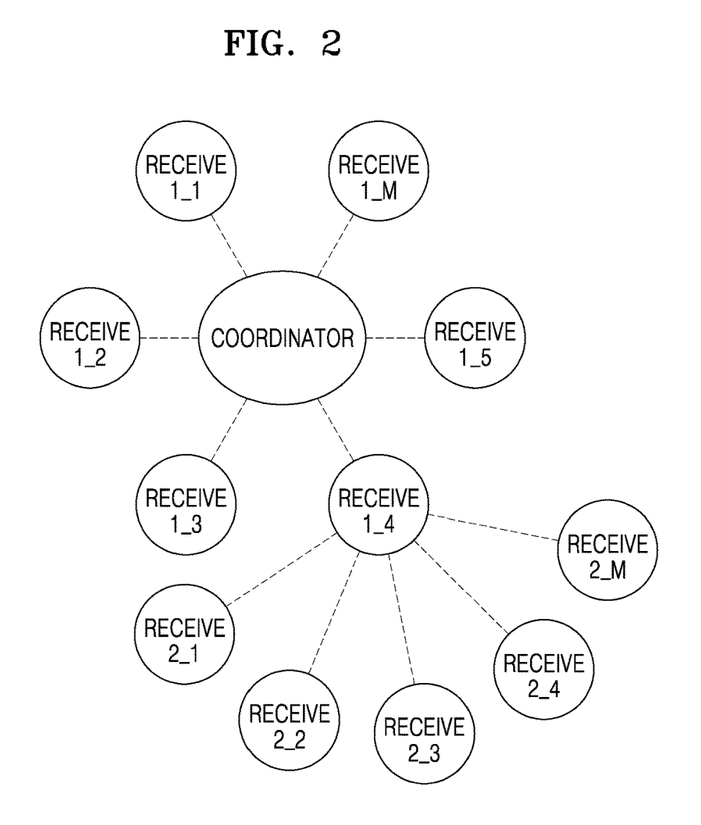
FIG. 2 is a schematic diagram of a Mesh type network topology provided by an exemplary embodiment of the disclosure.

According to an example embodiment, the aforementioned wireless personal area network may include a star network topology as shown in FIG. 1 or a Mesh network topology as shown in FIG. 2.

According to an exemplary embodiment illustrated in FIG. 1, the star network topology includes a central node device and multiple neighbor devices. According to an exemplary embodiment, the central node device may be a Coordinator and the multiple neighbor devices may be Receiver1, Receiver2, and Receiver3, etc. The central node device may transmit data to its neighbor devices. That is, the central node device performs the data transmission method provided by the exemplary embodiment of the disclosure for its neighbor devices.

According to an exemplary embodiment illustrated in FIG. 2, the Mesh network topology includes a central node device and multiple first neighbor devices. According to an exemplary embodiment, the central node device may be a Coordinator and the multiple neighbor devices may be Receiver 1_1, Receiver 1_2, and Receiver 1_3, etc. The central node device may transmit data to its first neighbor devices, that is, the central node device performs the data transmission method provided by the exemplary embodiment of the disclosure for its first neighbor devices. In addition, according to an example embodiment, at least one first neighbor device of the central node device may also have second neighbor devices. For example, the first neighbor device Recevier1_4 has multiple second neighbor devices (such as Recevier2_1, Recevier2_2, Recevier2_3, etc.) thereof. The first neighbor device may transmit data to the second neighbor devices. That is, the first neighbor device performs the data transmission method provided by the exemplary embodiment of the disclosure for its second neighbor devices.

It can be seen from the above content that the central node device of the data transmission method provided by the exemplary embodiment of the disclosure may be the coordinator in the star network topology shown in FIG. 1, or may be the coordinator and/or the at least one first neighbor device in the Mesh network topology shown in FIG.2. In the subsequent content, the coordinator in the star network topology shown in FIG. 1, the coordinator in the Mesh network topology shown in FIG. 2, or the first neighbor device (the first neighbor device has at least one second neighbor device) in the Mesh network topology shown in FIG. 2 will be referred by the term "coordinator".

A device as the coordinator has functions of being responsible for managing a maintenance and switching process of the OFDMA transmission mechanism and a default transmission mechanism. According to an example embodiment, the coordinator is responsible for managing connected child nodes of the current device in the low-rate personal area network, is responsible for managing block data to be transmitted, and receiving data to be transmitted and performing buffer management, and is responsible for allocating sub-channel resource information and timing information to specific receiving nodes.

According to another exemplary embodiment, the device as the may be the central node (Coordinator) in FIG. 1 or 2, wherein the central node may be pre-configured or selected by a staff when the wireless personal area network is established. For example, after broadband is installed in the home, a wireless router may be used as the central node (a data transmitting end), and the user's mobile phone, tablet computer, and smart home appliances that need to be connected to the Internet or support the IoT may be used as the neighbor nodes (data receiving ends). The wireless router may be configured to be responsible for managing the maintenance and switching process of the OFDMA transmission mechanism and the default transmission mechanism of the smart home appliances to ensure that the smart home appliances are in a low energy consumption or standby state during a non-data transmission phase to save power.

Figure 3:
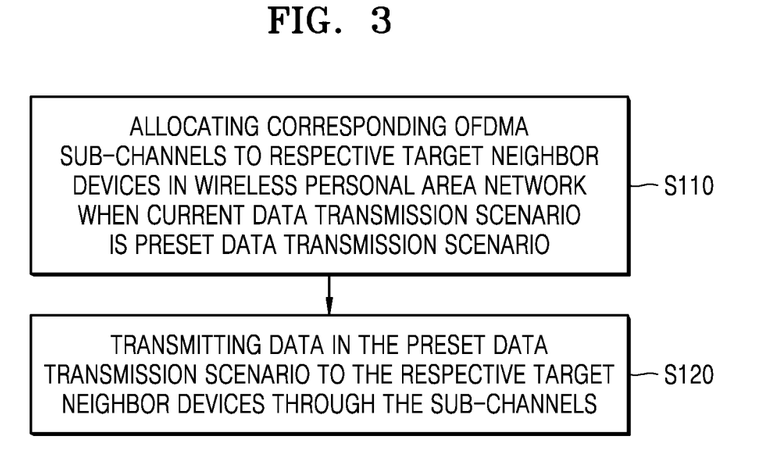
FIG. 3 is a flowchart of a data transmission method provided by an exemplary embodiment of the disclosure.

FIG. 3 is a schematic flowchart of a data transmission method provided by an exemplary embodiment of the disclosure.

Referring to FIG. 3, in operation S110, when a current data transmission scenario is a certain data transmission scenario, corresponding OFDMA sub-channels are allocated to respective target neighbor devices in a wireless personal area network. According to an exemplary embodiment, the certain data transmission scenario in the WPAN is preset scenario data transmission scenario.

According to an exemplary embodiment, the preset data transmission scenario may include a large block data transmission scenario or a device firmware upgrade scenario. When it is determined that the current data transmission scenario is the large block data transmission scenario or the device firmware upgrade scenario, target neighbor devices that are to use an OFDMA transmission mechanism are selected among multiple neighbor devices.

According to an exemplary embodiment, the operation of selecting the target neighbor devices that are to use the OFDMA transmission mechanism among the multiple neighbor devices may include determining neighbor devices that support the OFDMA transmission mechanism among a plurality of neighbor devices in the wireless personal area network, and using the neighbor devices that support the OFDMA transmission mechanism and are currently on the network as the target neighbor devices.

According to an exemplary embodiment, the coordinator may inquire whether each first neighbor device supports the OFDMA transmission mechanism, store first neighbor devices that support the OFDMA transmission mechanism in a first list, and use the first neighbor devices in the first list as the target neighbor devices.

According to an exemplary embodiment, the operation of allocating the corresponding OFDMA sub-channels to the respective target neighbor devices in the wireless personal area network may include determining an allocation method according to a comparison result of a number of the target neighbor devices and a number of the sub-channels and allocating the corresponding OFDMA sub-channels to the respective target neighbor devices based on the determined allocation method. It should be understood that when allocating the corresponding OFDMA sub-channels to the respective target neighbor devices in the wireless personal area network, it is ensured that each target neighbor device is allocated to one sub-channel.

The comparison result of the number of the target neighbor devices and the number of the sub-channels may be divided into two cases. The comparison results of the two cases correspond to different allocation methods. Thereafter, the allocation methods corresponding to the comparison results of the two cases will be described.

When the number of the target neighbor devices is not greater than the number of the sub-channels, one corresponding OFDMA sub-channel is allocated to each of the target neighbor devices.

As an example, if the number of the target neighbor devices is 3 and the number of the sub-channels is 4, one sub-channel may be allocated to each of the 3 target neighbor devices.

When the number of the target neighbor devices is greater than the number of the sub-channels, the target neighbor devices are grouped, and one corresponding OFDMA sub-channel is allocated to each group of the target neighbor devices. Here, a number of groups of the target neighbor devices is not greater than the number of the sub-channels, and each group of the target neighbor devices includes at least one target neighbor device.

As an example, the number of the sub-channels is 5 and the number of the target neighbor devices is 9, and the number of groups of the target neighbor devices should not be greater than 5. For example, the number of groups of the target neighbor devices is 2, where a first group includes 5 target neighbor devices and a second group includes 4 target neighbor devices, then one sub-channel may be allocated to each of the 2 groups of target neighbor devices, respectively.

According to an exemplary embodiment, the operation of grouping the target neighbor devices may include grouping the target neighbor devices based on a Received Signal Strength Indication (RSSI) value and/or a communication service weight of each of the target neighbor devices.

As an example, the target neighbor devices may be divided into K levels according to the RSSI values in an order of from high to low, and target neighbor devices of each level are regarded as a group of target neighbor devices, that is, K is the number of groups of target neighbor devices.

It can be understood that the RSSI value of each target neighbor device may be obtained from historical data transmission record of the target neighbor device. The larger the RSSI value is, the stronger the ability of the target neighbor device to receive signals is; otherwise, the smaller the RSSI value is, the weaker the ability of the target neighbor device to receive signals is. Referring to FIGS. 1 and 2, grouping according to the RSSI values may facilitate the central node (Coordinator) as the data transmitting end to balance the transmission power and save energy. Specifically, for a target neighbor node with a relatively larger RSSI value, data may be transmitted with a lower power, and for a target neighbor node with a smaller RSSI value, data may be transmitted with a higher power.

As an example, the target neighbor devices may be divided into K levels according to the communication service weights from high to low, and target neighbor devices of each level are regarded as a group of target neighbor devices, that is, K is the group number of target neighbor devices.

Herein, the communication service weight may include a historical service data transmission volume and/or importance of the historical service data of the target neighbor device. It can be understood that, taking the historical service data transmission volume as an example, the larger the value of the historical service data transmission volume is, it shows the higher the communication service weight of the corresponding target neighbor device is, and the higher it ranks when grouping; otherwise, the smaller the value of the historical service data transmission volume is, it shows the lower the communication service weight of the corresponding target neighbor device is, and the lower it ranks when grouping. Such grouping may ensure that important data or data with large transmission volume is transmitted first in the case of network instability.

As an example, the target neighbor devices may be divided into K levels according to the RSSI values and the communication service weights in an order of from high to low, and target neighbor devices of each level are regarded as a group of target neighbor devices, that is, K is the number of groups of target neighbor devices. The specific grouping method may be combined with the above two examples, which will not be repeated here.

According to an exemplary embodiment, the number of groups of the target neighbor devices is equal to a value obtained by dividing the number of the target neighbor devices by the number of the sub-channels and rounding up. For example, if the number of the target neighbor devices is N and the number of the OFDMA sub-channels is M, K=N/M. It can be understood that N, M, and K are all positive integers.

In operation S120, data in the preset data transmission scenario is transmitted to respective target neighbor devices through the sub-channels.

As an example, the coordinator transmits resource information for OFDMA scheduling to the corresponding target neighbor device through the sub-channel, where the resource information for OFDMA scheduling includes transmitting power, center frequency offset, timing information, and resource unit allocation information and so on.

It should be noted that the value of the transmitting power received by each target neighbor device is determined according to the level determined by its RSSI value. For example, as described in the previous section, in terms of balancing the transmitting power of the central node, the larger the RSSI value of the target neighbor device is, the lower it receives the transmitting power; otherwise, the smaller the RSSI value of the target neighbor device, the greater it receives the transmitting power.

The coordinator and the target neighbor device respectively configure OFDMA information parameters according to the resource information for OFDMA scheduling, and then start the OFDMA transmission process, that is, the coordinator transmits data in the big block data transmission scenario or the device firmware upgrade scenario to the corresponding target neighbor device through the sub-channel.

According to the data transmission method provided by the exemplary embodiments of the disclosure, the OFDMA transmission mechanism is supported in the SoC system under the wireless local area network and the wireless personal area network, and the OFDMA transmission mechanism is provided in data transmission scenarios with a large amount of data, thereby improving the data transmission rate and saving the data transmission time.

In addition, the data transmission method may be applied to a multi-mode chip with the OFDMA communication mechanism, which greatly shortens the time of the block transmission, improves the efficiency of the block transmission of the low-power devices in the wireless personal area network and saves device power consumption without additional hardware module overhead, thereby improving the competitiveness of chip products.

According to an exemplary embodiment, after operation S120 (i.e., after the data transmission in the preset data transmission scenario is completed), the method may further include transmitting transmission mechanism switching notifications to the target neighbor devices, so that the target neighbor devices switch to a default transmission mechanism.

The multi-mode-oriented SoC system provided by the exemplary embodiments of the disclosure may adopt two transmission mechanisms: the OFDMA transmission mechanism and the default transmission mechanism. The OFDMA transmission mechanism may be used in the preset data transmission scenario, and the default transmission mechanism may be used in other preset data transmission scenarios. The default transmission mechanism may be a data transmission mechanism other than the OFDMA transmission mechanism. After the data transmission in the preset data transmission scenario is completed, the coordinator may transmit the transmission mechanism switching notification to the target neighbor device. After the target neighbor device receives the transmission mechanism switching notification, it switches the link and radio mode, so as to switch to the default transport mechanism.

According to an exemplary embodiment, after operation S120, the method may further include transmitting inquiries for results of switching the transmission mechanism to the target neighbor devices, and receiving results of switching the transmission mechanism returned by the target neighbor devices.

After the coordinator transmits the transmission mechanism switching notifications to the target neighbor devices, it may transmit the inquiries for the transmission mechanism switching results to the target neighbor devices after a preset period of time, and the target neighbor devices may return the transmission mechanism switching results after receiving the inquiries. It can be understood that the transmission mechanism switching result may include a result of switching to the default transmission mechanism and a result of not switching to the default transmission mechanism.

It should be understood that after the target neighbor device switches to the default transmission mechanism, the default transmission mechanism may be used between the coordinator and the target neighbor device for data transmission.

Alternatively, after step S120, the method further includes: when it is determined that at least one of the target neighbor devices is abnormal, retransmitting the data in the preset data transmission scenario to the at least one of the target neighbor devices that is abnormal.

It should be noted here that for the star network topology shown in FIG. 1, the central node device may use the data transmission method provided by the exemplary embodiment of the disclosure to transmit data in a preset data transmission scenario to its first neighbor devices.

For the mesh network topology shown in FIG. 2, the central node device may first use the data transmission method provided by the exemplary embodiment of the disclosure to transmit data in a preset data transmission scenario to its first neighbor device. For a first neighbor device (such as Recevierl 4) with multiple second neighbor devices, after receiving the data in the preset data transmission scenario transmitted by the central node device, the first neighbor device uses the data transmission method provided by the exemplary embodiment of the disclosure to transmit the data in the preset data transmission scenario to its second neighbor devices.

Figure 4:
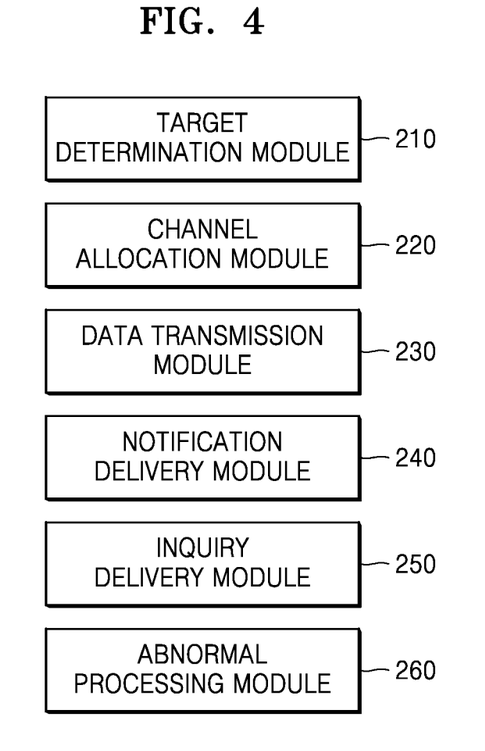
FIG. 4 is a block diagram of a data transmission device provided by an exemplary embodiment of the disclosure.

FIG. 4 is a block diagram of a data transmission device according to an exemplary embodiment of the disclosure.

Referring to FIG. 4, the data transmission device may include a target determination module 210, a channel allocation module 220, a data transmission module 230, a notification delivery module 240, an inquiry delivery module 250, and an abnormal processing module 260. According to an example embodiment, each module in the data transmission device of FIG. 4 may be configured as software, hardware, firmware or any combination of the foregoing items to perform specific functions. For example, each modules may correspond to a dedicated integrated circuit, may also correspond to a pure software code, or may correspond to a module combining software and hardware. In addition, one or more functions implemented by each module may also be uniformly executed by components in a physical device (for example, a processor, a terminal or a server, etc.). For example, a memory may store one or more program code or instructions, and the processor may execute the one or more program code or the instructions to implement one or more of the modules illustrated in FIG. 4.

According to an example embodiment, the channel allocation module 220 may be configured to allocate corresponding OFDMA sub-channels to respective target neighbor devices in a wireless personal area network when a current data transmission scenario is a preset data transmission scenario.

According to an exemplary embodiment, the data transmission module 230 may be configured to transmit data in the preset data transmission scenario to the respective target neighbor devices through the sub-channels.

According to another exemplary embodiment, the preset data transmission scenario includes a large block data transmission scenario and a device firmware upgrade scenario.

According to another exemplary embodiment, the target determination module 210 may be configured to determine neighbor devices that support an OFDMA transmission mechanism among a plurality of neighbor devices in the wireless personal area network and use the neighbor devices that support the OFDMA transmission mechanism and are currently on the network as the target neighbor devices.

According to another exemplary embodiment, the channel allocation module 220 may be configured to determine an allocation method according to a comparison result of a number of the target neighbor devices and a number of the sub-channels and allocate the corresponding OFDMA sub-channels to the respective target neighbor devices based on the determined allocation method.

According to another exemplary embodiment, the channel allocation module 220 may be configured to allocate one corresponding OFDMA sub-channel to each of the target neighbor devices when the number of the target neighbor devices is not greater than the number of the sub-channels. Moreover, the channel allocation module 220 may be configured to group the target neighbor devices when the number of the target neighbor devices is greater than the number of the sub-channels, and allocate one corresponding OFDMA sub-channel to each group of the target neighbor devices. According to an example embodiment, a number of groups of the target neighbor devices is not greater than the number of the sub-channels, and each group of the target neighbor devices includes at least one target neighbor device.

According to another exemplary embodiment, the channel allocation module 220 may be further configured to group the target neighbor devices based on a RSSI value or a communication service weight of each of the target neighbor devices. According to another exemplary embodiment, the channel allocation module 220 may be further configured to group the target neighbor devices based on a RSSI value and a communication service weight of each of the target neighbor devices.

According to another exemplary embodiment, the number of groups of the target neighbor devices is equal to a value obtained by dividing the number of the target neighbor devices by the number of the sub-channels and rounding up.

According to another exemplary embodiment, the notification delivery module 240 may be further configured to transmit transmission mechanism switching notifications to the target neighbor devices after the data transmission in the preset data transmission scenario is completed, so that the target neighbor devices switch to a default transmission mechanism.

According to another exemplary embodiment, the inquiry delivery module 250 may be configured to transmit inquiries for transmission mechanism switching results to the target neighbor devices, and receive the transmission mechanism switching results returned by the target neighbor devices.

According to another exemplary embodiment, the abnormal processing module 260 may be configured to retransmit the data in the preset data transmission scenario to at least one of the target neighboring devices when it is determined that the at least one of the target neighbor devices is abnormal.

The data transmission device may be responsible for managing a maintenance and switching process of the OFDMA transmission mechanism and a default transmission mechanism, managing connected child nodes of the current device in the low-rate personal area network, managing block data to be transmitted, and receiving data to be transmitted and performing buffer management and allocating sub-channel resource information and timing information to specific receiving nodes.

The data transmission method and device according to the exemplary embodiment of the disclosure have been described above with reference to FIGS. 1 to 4.

According to the data transmission method and device provided by the exemplary embodiments of the disclosure, the OFDMA transmission mechanism is supported in the SoC system under the wireless local area network and the wireless personal area network, and the OFDMA transmission mechanism is provided in data transmission scenarios with a large amount of data, thereby improving the data transmission rate and saving the data transmission time.

In addition, the data transmission method may be applied to a multi-mode chip with the OFDMA communication mechanism, which greatly shortens the time of the block transmission, improves the efficiency of the block transmission of the low-power devices in the wireless personal area network and saves device power consumption without additional hardware module overhead, thereby improving the competitiveness of chip products.

In addition, the data transmission method described with reference to FIG. 3 may be implemented by a program (or instruction) recorded on a computer-readable storage medium. For example, according to the exemplary embodiment of the disclosure, a computer-readable storage medium storing instructions may be provided, wherein the instructions, when executed by at least one computing device, cause the at least one computing device to perform the data transmission method according to the disclosure.

The computer program in the above computer-readable storage medium may run in an environment deployed in a computer device such as a terminal, a host, an agent device and a server. It should be noted that the computer program may also be used to perform additional steps in addition to the above steps or perform more specific processing when performing the above steps. The content of these additional steps and further processing has been mentioned in the description of the related method with reference to FIG. 3, thus it will not be repeated here.

It should be noted that each module in the data transmission device according to the exemplary embodiment of the disclosure may completely rely on the operation of the computer program to realize the corresponding functions, that is, each module corresponds to each step in the functional architecture of the computer program, the whole system is called through a special software package (for example, lib library) to realize the corresponding functions.

On the other hand, each module shown in FIG. 4 may also be implemented by hardware, software, firmware, middleware, microcode, or any combination thereof. When implemented in software, firmware, middleware or microcode, the program code or code segment used to perform the corresponding operations may be stored in a computer-readable medium such as a storage medium, so that the processor may read and run the corresponding program code or code segment to perform the corresponding operations.

For example, the exemplary embodiment of the disclosure may also be implemented as a computing device, which includes a storage component and a processor. The storage component stores a set of computer executable instructions. When the set of computer executable instructions is executed by the processor, the processor performs the data transmission method according to the exemplary embodiment of the disclosure.

Specifically, the computing device may be deployed in a server or a terminal, and may also be deployed on a node device in a distributed network environment. In addition, the computing device may be a PC computer, a tablet device, a personal digital assistant, a smart phone, a web application, or other devices capable of executing the above set of instructions.

Here, the computing device does not have to be a single computing device, and may also be any combination of devices or circuits that may execute the above instructions (or instruction sets) individually or jointly. The computing device may also be a part of an integrated control system or a system manager, or may be configured as a portable electronic device interconnected by interface with local or remote (e.g., via wireless transmission).

In the computing device, the processor may include a central processing unit (CPU), a graphics processing unit (GPU), a programmable logic device, a dedicated processor system, a microcontroller, or a microprocessor. By way of example and not limitation, the processor may also include an analog processor, a digital processor, a microprocessor, a multi-core processor, a processor array, a network processor, etc.

Some operations described in the data transmission method according to the exemplary embodiment of the disclosure may be implemented in software, and some operations may be implemented in hardware. In addition, these operations may also be implemented in a combination of software and hardware.

The processor may run instructions or codes stored in the storage component, where the storage component may also store data. Instructions and data may also be transmitted and received through a network via a network interface device, where the network interface device may use any known transmission protocol.

The storage component may be integrated with the processor, for example, RAM or flash memory is arranged in an integrated circuit microprocessor or the like. In addition, the storage component may include a separate device, such as an external disk drive, storage array, or any other storage device that may be used by a database system. The storage component and the processor may be operatively coupled, or may communicate with each other, for example, through an I/O port, a network connection, or the like, so that the processor may read files stored in the storage component.

In addition, the computing device may also include a video display (for example, a liquid crystal display) and a user interaction interface (such as a keyboard, a mouse, a touch input device, etc.). All components of the computing device may be connected to each other via a bus and/or network.

The data transmission method according to the exemplary embodiment of the disclosure may be described as various interconnected or coupled functional blocks or functional diagrams. However, these functional blocks or functional diagrams may be equally integrated into a single logic device or operate according to imprecise boundaries.

Therefore, the data transmission method described with reference to FIG. 3 may be implemented by a system including at least one computing device and at least one storage device storing instructions.

According to an exemplary embodiment of the disclosure, the at least one computing device is a computing device for performing the data transmission method according to the exemplary embodiment of the disclosure, and the storage device may store a computer-executable instruction set. When the computer-executable instruction set is executed by the at least one computing device, the data transmission method described with reference to FIG. 3 is performed.

The exemplary embodiments of the disclosure have been described above, and it should be understood that the foregoing description is only exemplary and not exhaustive, and the disclosure is not limited to the disclosed exemplary embodiments. Many modifications and alterations are obvious to those of ordinary skill in the art without departing from the scope and spirit of the disclosure. Therefore, the protection scope of the disclosure should be subject to the scope of the claims.

What is claimed is:

1. A data transmission method of a transmission device, the method comprising:
    initiating a first transmission mechanism by allocating corresponding Orthogonal Frequency Division Multiple Access (OFDMA) sub-channels to respective one or more target neighbor devices in a wireless personal area network (WPAN) based on a determination that a current data transmission scenario of the WPAN is a specific data transmission scenario;
    transmitting data in the current data transmission scenario to the respective one or more target neighbor devices through the OFDMA sub-channels; and
    performing transmission mechanism switching operation to initiate a second transmission mechanism based on a determination that the transmitting of the data in the current data transmission scenario is completed.

2. The data transmission method of claim 1, wherein the specific data transmission scenario is one of a large block data transmission scenario or a device firmware upgrade scenario.

3. The data transmission method of claim 1, further comprising:
    determining one or more neighbor devices that support an OFDMA transmission mechanism among a plurality of neighbor devices in the wireless personal area network; and
    identifying the one or more neighbor devices that support the OFDMA transmission mechanism and are currently on the WPAN as the one or more target neighbor devices.

4. The data transmission method of claim 1, wherein the allocating the corresponding OFDMA sub-channels to the respective one or more target neighbor devices in the WPAN comprises:
    determining an allocation method according to a comparison result of a number of the one or more target neighbor devices and a number of the sub-channels, and
    allocating the corresponding OFDMA sub-channels to the respective one or more target neighbor devices based on the determined allocation method.

5. The data transmission method of claim 4, wherein the determining the allocation method according to the comparison result of the number of the one or more target neighbor devices and the number of the sub-channels and allocating the corresponding OFDMA sub-channels to the respective one or more target neighbor devices based on the determined allocation method comprises:
    based on the number of the one or more target neighbor devices not being greater than the number of the sub-channels, allocating one corresponding OFDMA sub-channel to each of the one or more target neighbor devices; and
    based on the number of the one or more target neighbor devices being greater than the number of the sub-channels, grouping the one or more target neighbor devices, and allocating one corresponding OFDMA sub-channel to each group of the one or more target neighbor devices,
    wherein, a number of groups of the one or more target neighbor devices is not greater than the number of the sub-channels, and each group of the one or more target neighbor devices comprises at least one target neighbor device.

6. The data transmission method of claim 5, wherein the grouping the one or more target neighbor devices comprises: grouping the one or more target neighbor devices based on a Received Signal Strength Indication (RSSI) value or a communication service weight of each of the one or more target neighbor devices.

7. The data transmission method of claim 1, further comprising:
    transmitting a transmission mechanism switching notification to the one or more target neighbor devices to perform the transmission mechanism switching operation,
    transmitting an inquiry to the one or more target neighbor devices regarding a result of the transmission mechanism switching operation, and receiving the result of the transmission mechanism switching operation returned by the one or more target neighbor devices.

8. A data transmission device comprises:
a processor configured to:
initiate a first transmission mechanism by allocating corresponding Orthogonal Frequency Division Multiple Access (OFDMA) sub-channels to respective one or more target neighbor devices in a wireless personal area network (WPAN) based on a determination that a current data transmission scenario of the WPAN is a specific data transmission scenario;
transmit data in the specific data transmission scenario to the respective one or more target neighbor devices through the OFDMA sub-channels; and
perform transmission mechanism switching operation to initiate a second transmission mechanism based on a determination that the transmitting of the data in the current data transmission scenario is completed.

9. The data transmission device of claim 8, wherein the specific data transmission scenario is one of a large block data transmission scenario or a device firmware upgrade scenario.

10. The data transmission device of claim 8, wherein the processor is further configured to:
determine one or more neighbor devices that supports an OFDMA transmission mechanism among a plurality of neighbor devices in the WPAN; and
identify the one or more neighbor devices that supports the OFDMA transmission mechanism and are currently on the WPAN as the tone or more arget neighbor devices.

11. The data transmission device of claim 8, wherein the processor is further configured to:
determine an allocation method according to a comparison result of a number of the one or more target neighbor devices and a number of the sub-channels and allocate the corresponding OFDMA sub-channels to the respective one or more target neighbor devices based on the determined allocation method.

12. The data transmission device of claim 11, wherein the processor is further configured to:
based on the number of the one or more target neighbor devices not being greater than the number of the sub-channels, allocate one corresponding OFDMA sub-channel to each of the one or more target neighbor devices; and
based on the number of the one or more target neighbor devices being greater than the number of the sub-channels, group the one or more target neighbor devices, and allocate one corresponding OFDMA sub-channel to each group of the one or more target neighbor devices,
wherein, a number of groups of the one or more target neighbor devices is not greater than the number of the sub-channels, and each group of the one or more target neighbor devices comprises at least one target neighbor device.

13. The data transmission device of claim 12, wherein the processor is further configured to group the one or more target neighbor devices based on a Received Signal Strength Indication (RSSI) value or a communication service weight of each of the one or more target neighbor devices.

14. The data transmission device of claim 8, wherein the processor is further configured to:
transmit a transmission mechanism switching notification to the one or more target neighbor devices to perform a transmission mechanism switching operation,
transmit an inquiry to the one or more target neighbor devices regarding a result of the transmission mechanism switching operation, and
receive the result of the transmission mechanism switching operation returned by the one or more target neighbor devices.

15. A server comprising at least one computing device and at least one memory storing instructions, wherein the instructions, when executed by the at least one computing device, cause the at least one computing device to execute a data transmission method as claimed in claim 1.

16. A non-transitory computer-readable storage medium storing instructions, wherein the instructions, when executed by at least one computing device, cause the at least one computing device to perform a data transmission method as claimed in claim 1.

17. A data transmission device comprises:
a memory storing one or more instructions; and
a processor configured to execute the one or more instructions to:
identify a type of data transmission currently implemented by a wireless personal area network (WPAN);
determine whether the type of data transmission currently implemented by the WPAN matches a specific criteria;
initiating a first transmission mechanism by allocating corresponding Orthogonal Frequency Division Multiple Access (OFDMA) sub-channels to respective one or more target neighbor devices in the WPAN based on the type of data transmission currently implemented by the WPAN matching the specific criteria; and
transmit data to the respective one or more target neighbor devices through the OFDMA sub-channels; and
perform transmission mechanism switching operation to initiate a second transmission mechanism based on a determination that the transmitting of the data in the current data transmission scenario is completed.

18. The data transmission device of claim 17, wherein the specific criteria is a large block data transmission scenario or a device firmware upgrade scenario.

19. The data transmission device of claim 17, wherein the processor is further configured to:
determine an allocation method according to a comparison result of a number of the one or more target neighbor devices and a number of the sub-channels and allocate the corresponding OFDMA sub-channels to the respective one or more target neighbor devices based on the determined allocation method.

20. The data transmission device of claim 19, wherein the processor is further configured to:
based on the number of the one or more target neighbor devices not being greater than the number of the sub-channels, allocate one corresponding OFDMA sub-channel to each of the one or more target neighbor devices; and
based on the number of the one or more target neighbor devices being greater than the number of the sub-channels, group the one or more target neighbor devices, and allocate one corresponding OFDMA sub-channel to each group of the one or more target neighbor devices, wherein, a number of groups of the one or more target neighbor devices is not greater than the number of the sub-channels, and each group of the one or more target neighbor devices comprises at least one target neighbor device.

* * * * *